(12) United States Patent
Yagi

(10) Patent No.: US 11,330,811 B2
(45) Date of Patent: May 17, 2022

(54) FISHING BAG WITH SHOULDER BELT

(71) Applicant: GLOBERIDE, Inc., Tokyo (JP)

(72) Inventor: Hiroshi Yagi, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 17/193,101

(22) Filed: Mar. 5, 2021

(65) Prior Publication Data

US 2021/0368761 A1 Dec. 2, 2021

(30) Foreign Application Priority Data

May 29, 2020 (JP) .............................. JP2020-095032

(51) Int. Cl.
| | | |
|---|---|---|
| *A45F 3/12* | (2006.01) | |
| *A01K 97/06* | (2006.01) | |
| *A45F 3/02* | (2006.01) | |
| *A45F 3/00* | (2006.01) | |

(52) U.S. Cl.
CPC ................ *A01K 97/06* (2013.01); *A45F 3/02* (2013.01); *A45F 3/12* (2013.01); *A45F 2003/003* (2013.01)

(58) Field of Classification Search
CPC ..... A45F 3/12; A45F 2003/003; A01K 97/06; A43F 3/02; A45C 13/30
USPC ......................................... 224/578–579, 610
See application file for complete search history.

(56) References Cited

U.S. PATENT DOCUMENTS

| | | | | |
|---|---|---|---|---|
| 511,690 A | * | 12/1893 | Edwards ................... | A45F 5/10 294/154 |
| 4,261,491 A | * | 4/1981 | Schroeder ................ | A45C 9/00 224/417 |
| 4,515,300 A | * | 5/1985 | Cohen ....................... | A45F 3/04 224/153 |
| 5,577,652 A | * | 11/1996 | Cooper ..................... | A45F 3/02 224/153 |
| 5,927,581 A | * | 7/1999 | Reddy ....................... | A45F 3/02 224/578 |
| 9,492,003 B2 | * | 11/2016 | Patel ......................... | A45F 3/04 |
| 2008/0283350 A1 | * | 11/2008 | Vorderkunz ........... | A45C 13/03 190/115 |

FOREIGN PATENT DOCUMENTS

| | | |
|---|---|---|
| CN | 206978485 U | 2/2018 |
| JP | 2001-286252 A | 10/2001 |
| JP | 2001286252 A * | 10/2001 |

(Continued)

OTHER PUBLICATIONS

Extended European Search Report for related European Application No. 21160937.5; action dated Aug. 4, 2021; (8 pages).

(Continued)

*Primary Examiner* — Adam J Waggenspack

(74) *Attorney, Agent, or Firm* — K&L Gates LLP

(57) ABSTRACT

A fishing bag with a shoulder belt is provided that includes a handle portion used to hold the fishing bag with a hand so that the usability is prevented from being compromised while preventing the shoulder belt from getting wet or dirty in a placed state. The fishing bag can include a handle including a pair of both end portions attached to a bag main body; and a shoulder belt including both end portions attached to the bag main body, wherein the shoulder belt is configured to be capable of being held between the bag main body and the handle.

8 Claims, 3 Drawing Sheets

(56) References Cited

FOREIGN PATENT DOCUMENTS

| | | |
|---|---|---|
| JP | 2005261249 A | 9/2005 |
| JP | 2007110994 A | 5/2007 |
| JP | 2007330158 A | 12/2007 |
| TW | 200727784 A | 8/2007 |

OTHER PUBLICATIONS

Office Action for related Taiwanese Application No. 110109149; report dated Nov. 4, 2021; (15 pages).

\* cited by examiner

FISHING BAG WITH SHOULDER BELT

TECHNICAL FIELD

This disclosure relates to a fishing bag with a shoulder belt.

BACKGROUND

Fishing bags with various shoulder belts that can be carried on the shoulder are known. Generally, the shoulder belt has both end portions fixed to both side surface portions of a bag main body opposite each other, and has a substantially center region, in its longitudinal direction, provided with a pad portion to reduce the load on the shoulder.

JP 2001-286252A discloses an example of such a fishing bag with a shoulder belt. JP 2001-286252A discloses a fishing bag with a shoulder belt having both ends attached to a bottomed bag main body. The shoulder belt has an intermediate portion provided with an engaged portion, and an engaging portion that can engage with the engaged portion of the shoulder belt is provided at a position that is at a predetermined height from a bottom surface of the bag main body.

When such a fishing bag is carried to and placed on a fishing spot, the shoulder belt of the fishing bag will be in a hung state, to have a center portion or the like (including a portion of the shoulder belt that may be in contact with the ground) touching the ground. The fishing spot is often wet. Thus, the center portion or the like of the shoulder belt touching the ground is likely to get wet or dirty.

With the mode disclosed in JP 2001-286252A, when the bag is placed on the ground with the engaged portion of the shoulder belt engaged with the engaging portion of the bag main body, the engaged portion is at a position at a predetermined height from the bottom surface of the bag main body, that is, at a predetermined height from the ground on which the bag is placed. Thus, the intermediate portion of the shoulder belt is engaged with the bag main body to be prevented from touching the ground.

However, the engaging portion needs to be provided to the bag main body and the engaged portion engaging with the engaging portion needs to be provided to the shoulder belt only for such a purpose. Furthermore, the engaging portion itself might hinder the use of the bag, and the engaged portion may compromise comfortable wearing on the shoulder.

It could therefore be helpful to provide a fishing bag with a shoulder belt, including a handle portion used for holding the fishing bag with a hand so that the usability is prevented from being compromised while preventing the shoulder belt from getting wet or dirty in a placed state.

SUMMARY

I thus provide:

A fishing bag may include: a handle including a pair of both end portions attached to a bag main body; and a shoulder belt including both end portions attached to the bag main body, wherein the shoulder belt is configured to be capable of being held between the bag main body and the handle. The shoulder belt may include a center portion, and the center portion of the shoulder belt is configured to be held between the bag main body and the handle.

The handle may include a detachable attachment portion, the detachable attachment portion is detachably fixed to the bag main body, and the shoulder belt is configured to be held between the detachable attachment portion and one both end portions that are one of the pair of both end portions of the handle.

The detachable attachment portion of the handle may be configured to be detachably fixed to the bag main body using a hook-and-loop fastener, a snap fastener, or a magnet.

The shoulder belt may be configured to include a shoulder pad, and the shoulder pad is held between the one both end portions of the handle.

The handle may include a handle center portion, and the detachable attachment portion of the handle is configured to be provided between the handle center portion and the one both end portions of the handle.

The shoulder belt may have both end portions attached to respective both side surface portions of the bag main body opposite to each other, and the handle configured to have the pair of both end portions provided to respective opposite side surface portions of the bag main body that are different from the both side surfaces.

The height of the detachable attachment portion of the handle from a bottom portion of the bag main body may be configured to be 50% to 95% of a height of the bag main body.

A length between the one both end portions of the handle may be configured to be 20% to 80% of a width of a side surface portion of the bag main body to which the both end portions are attached.

A fishing bag with a shoulder belt can thus be provided that includes a handle portion used to hold the fishing bag with a hand so that usability is prevented from being compromised while preventing the shoulder belt from getting wet or dirty in a placed state.

Figure 1:
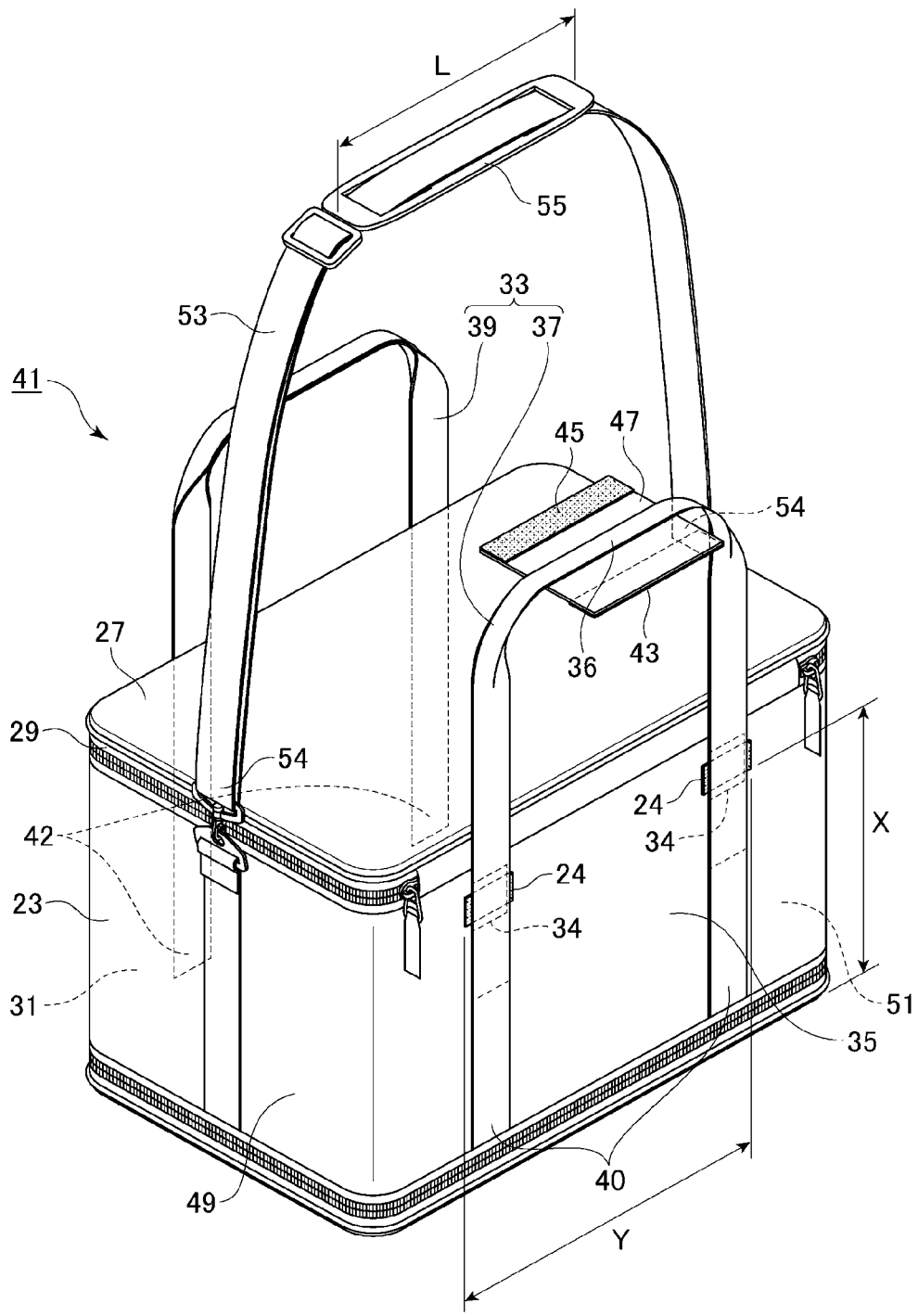
FIG. 1 is a diagram illustrating a fishing bag according to an example.

REFERENCE SIGNS LIST 23 bag main body
24 detachably attached portion
27 lid body
29 skirt portion
31 front surface side surface
33 handle
34 detachable attachment portion
35 rear surface side surface
36 handle center portion
37, 39 U-shaped handle
40, 42 pair of both end portions
41 fishing bag
43, 45 hook-and-loop fastener
47 handle bundling grip portion
49 left side surface
51 right side surface
53 shoulder belt
54 both end portions
55 shoulder pad (shoulder pad)
X height of detachable attachment portion
Y length of both end portions

DETAILED DESCRIPTION

Examples of a fishing rod will be described in detail with reference to the attached drawings. Elements common to a plurality of figures are denoted by the same reference numerals through the plurality of figures. For the sake of description, the figures are not necessarily drawn to scale.

One example of a fishing bag is described with reference to FIG. 1. As illustrated in the figure, the fishing bag 41 includes a waterproof bag main body 23 having a waterproof cloth (obtained by coating a nylon or polyester woven cloth with PVC/PU/EVA) provided on the outer side, a nylon or polyester cloth provided on the inner side, and a synthetic resin foaming material such as PE or Styrofoam provided in between (the waterproof cloth surface may alternatively be used on a reverse side). The foldable insulated bag is formed to be in a shape of a box having a bottom surface and side surfaces, with an internal portion serving as a storage portion, and with a storage port opened in an upper portion.

The lid body 27 formed of the same material as the bag main body 23 is coupled to one side (a rear surface side surface 35 described later) via a hinge member (not illustrated) made of a synthetic resin sheet (for example, nylon, polyester woven cloth or the like). The lid body 27 has a circumference edge portion provided with a skirt portion (side wall) 29 that surrounds an upper portion outer circumference of the bag main body 23 when the storage port is covered by the lid body 27 (when the storage port is closed by the lid body 27). The skirt portion 29 extends along the outer circumference.

The fishing bag 41 includes a handle 33 including a pair of both end portions attached to the bag main body 23. The handle 33 is attached to upper portion outer circumferences of a front surface side surface 31 and the rear surface side surface 35 of the bag main body 23 as illustrated in FIG. 1, for example. However, this should not be construed in a limiting sense. In the illustrated example, the handle 33 includes a pair of U-shaped handles 37 and 39, but is referred to as the handle 33 below for the sake of convenience. For example, center portions of the U-shaped handles 37 and 39 as the handle 33 may be capable of being bundled by a handle bundling grip portion 47 on which hook-and-loop fasteners 43 and 45 are sewed, to be held by a hand of a person carrying the fishing bag 41, but are not limited to such a mode.

The fishing bag 41 includes a shoulder belt 53 including both end portions attached to the bag main body 23. The shoulder belt 53 may be formed as a single thin belt-shaped shoulder belt 53 made of woven cloth of synthetic resin such as PP, fabric, leather or the like and is spun between left and right side surfaces 49 and 51 (left side surface 49, right side surface 51) of the bag main body 23 as illustrated in FIG. 1. Both end portions 54 of the shoulder belt 53 may be sewed and fixed to the left and right-side surfaces 49 and 51, but is not limited to such a mode.

The shoulder belt 53 of the fishing bag 41 has a length long enough for the center portion in the longitudinal direction to touch the ground, when the shoulder belt 53 hangs down from the fishing bag 41 placed on the ground. A plate-shaped shoulder pad 55 having a dimension (length L illustrated in FIG. 1) that is substantially ⅙ of the entire length of the shoulder belt 53 is attached to the center portion of the shoulder belt 53. The sizes of the shoulder belt 53 and the shoulder pad 55 may be of various possible sizes, and thus are not limited to a particular mode.

The fishing bag 41 includes a handle 33 including a pair of both end portions 40 and 42 attached to the bag main body 23, and the shoulder belt 53 including both end portions 54 attached to the bag main body 23. The shoulder belt 53 or a center portion 56 of the shoulder belt 53 is configured to be capable of being held between the bag main body 23 and the handle 33. The center portion 56 is assumed to be a portion at a center of the shoulder belt 53, with a length of 200 mm to 900 mm in an extending direction of the shoulder belt 53, or 30% to 80% of the entire length of the shoulder belt 53 in the extending direction. Any position on the shoulder belt or the center portion of the shoulder belt is capable of being held between the bag main body 23 and the handle 33, whereby the held portion of the shoulder belt 53 as well as any portion between the portion and the both end portions 54 can be prevented from touching the ground.

A fishing bag with a shoulder belt can be provided that includes a handle portion used to hold the fishing bag with a hand so that the usability is prevented from being compromised while preventing the shoulder belt from getting wet or dirty in a placed state.

Figure 2:
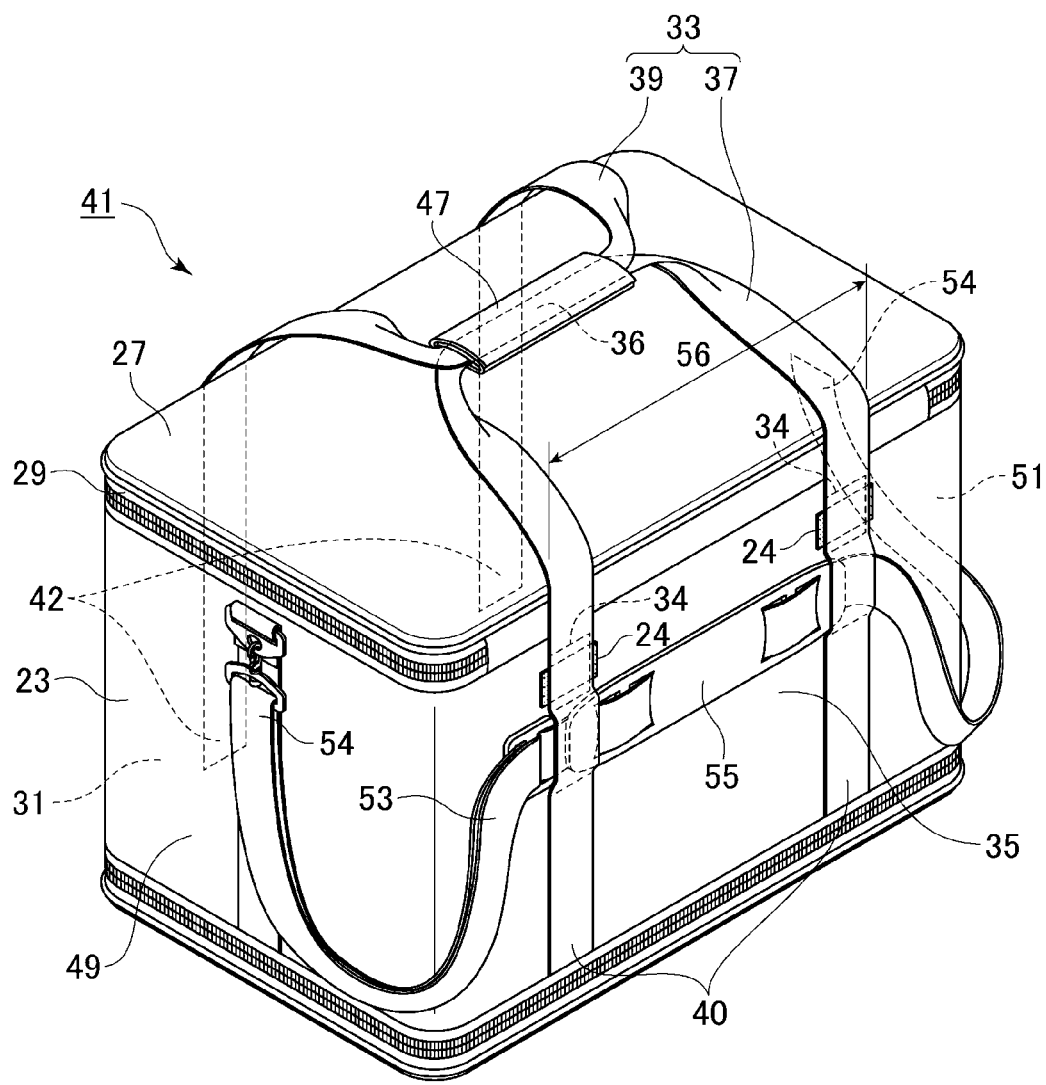
FIG. 2 is a diagram illustrating the fishing bag according to an example.
Figure 3:
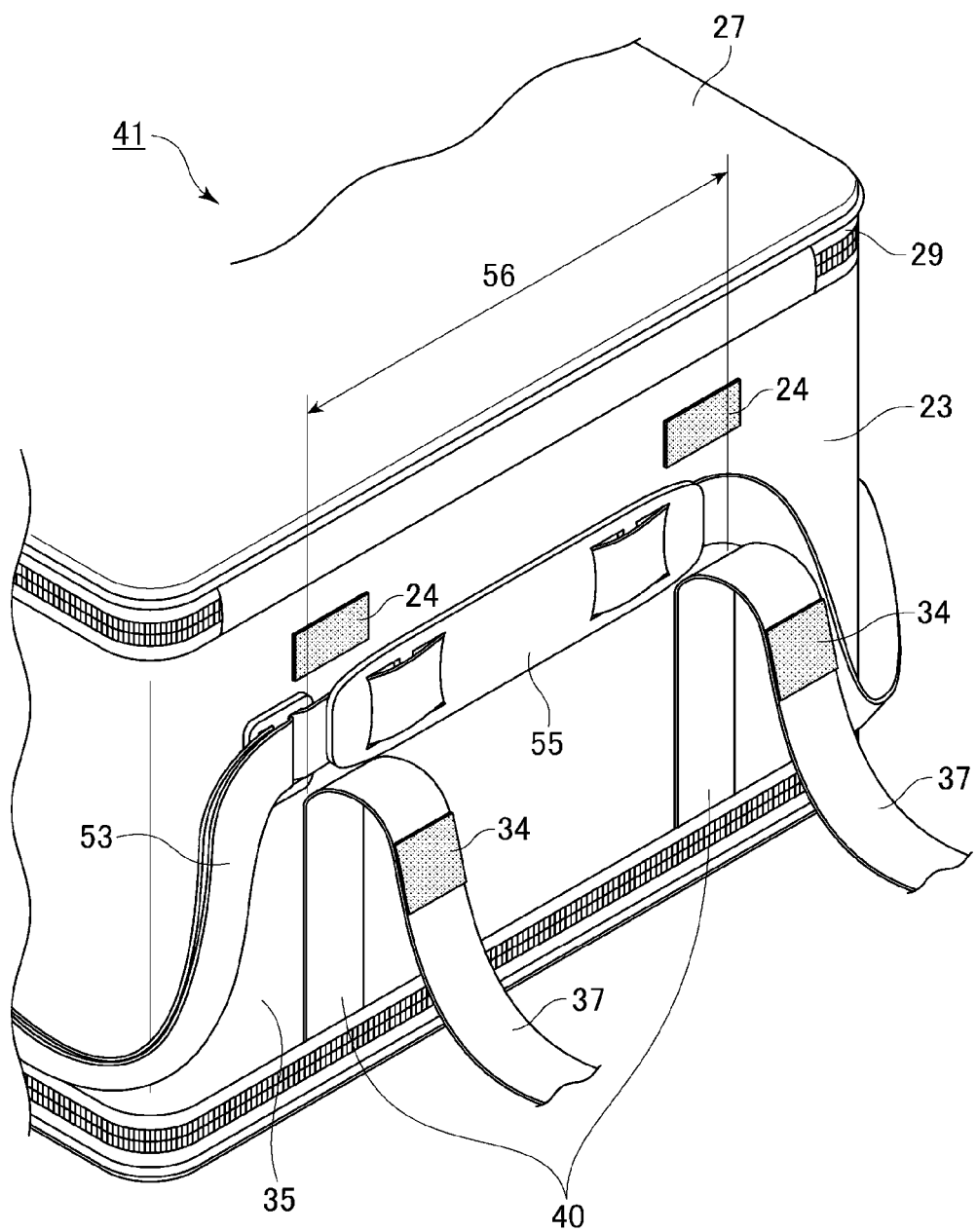
FIG. 3 is a diagram illustrating a portion around detachable attachment portions of the fishing bag according to an example.

Next, the fishing bag 41 will be described more in detail with reference to FIGS. 2 and 3. As illustrated in the figure, the fishing bag 41 is configured with the handle 33 including detachable attachment portions 34, the detachable attachment portions 34 detachably fixed to the bag main body 23, and the shoulder belt 53 held between one both end portions that are one of the pair of both end portions 40 and 42 of the handle 33 and the detachable attachment portion 34. The bag main body 23 is provided with detachably attached portions 24 to which the detachable attachment portions of the handle 33 are fixed.

With the fishing bag according to one example, a fishing bag with a shoulder belt can be provided that includes a handle portion used to hold the fishing bag with a hand so that the usability is prevented from being compromised while preventing the shoulder belt from getting wet or dirty in a placed state.

The detachable attachment portion 34 of the handle 33 is configured to be detachably fixed to the bag main body 23 using a hook-and-loop fastener, a snap fastener, or a magnet. FIGS. 2 and 3 illustrate an example of a fishing bag where the detachable attachment portions 34 of the handle 33 are hook-and-loop fasteners. More specifically, the detachable attachment portions 34 of the handle 33 are configured to be female hook-and-loop fasteners and the detachably attached portions 24 of the bag main body 23 are configured to be male hook-and-loop fasteners. The detachable attachment portions 34 and the detachably attached portions may be of various possible modes, and thus are not limited to a particular mode.

The shoulder belt 53 includes a shoulder pad 55 configured to be held between the one both end portions that are one of the pair of both end portions 40 and 42 of the handle 33.

The handle 33 includes a handle center portion 36, and the detachable attachment portions 34 of the handle 33 are configured to be provided between the handle center portion 36 and the one both end portions that are one of the pair of both end portions 40 and 42 of the handle 33.

A fishing bag with a shoulder belt can thus be provided including a handle portion to hold the fishing bag with a hand, the height of the extending range of which can be effectively utilized so that the usability is prevented from being compromised while preventing the shoulder belt from getting wet or dirty in a placed state.

The shoulder belt 53 has both end portions 54 attached to both side surface portions of the bag main body 23 opposite to each other, and the handle 33 is configured to have the pair of both end portions 40 and 42 provided to respective opposite side surface portions of the bag main body different from the both side surfaces.

The height of the detachable attachment portions 34 of the handle 33 from the bottom portion of the bag main body 23 is configured to be a height (X) which is in a range from 50% to 95% of the height of the bag main body 23. With this configuration, the shoulder belt would not touch the dirty ground or water surface to get dirty, and thus clothing of a user carrying the bag with the shoulder belt on his or her shoulder would not get wet or dirty.

A length between the one both end portions that are one of the pair of both end portions 40 and 42 of the handle 33 is configured to be a length (Y) that is 20% to 80% of the width of the side surface portion of the bag main body to which the both end portions are attached. With this configuration, when the bag is lifted using the handles, the bag can be carried while maintaining a substantially horizontal state, without being slanted due to the content being heavier either on the left or right sides.

The dimensions, material, and arrangement of each component described herein are not limited to those explicitly described in the examples, and each of these components can be modified to have any desirable dimensions, material, and arrangement that can fall within the scope of this disclosure. Components that are not explicitly described herein may be added to the described examples, and some of the components described in each example may be omitted.

What is claimed is:

1. A fishing bag comprising:
   a handle including a pair of end portions, both of which are attached to a bag main body; and
   a shoulder belt including end portions, both of which are attached to the bag main body,
   wherein the shoulder belt is configured to be held between the bag main body and the handle while the end portions of the shoulder belt are attached to the bag main body,
   wherein the handle includes a detachable attachment portion, the detachable attachment portion is detachably fixed to the bag main body, and a center portion of the shoulder belt is configured to be held between the detachable attachment portion and one of the pair of end portions of the handle,
   wherein when the shoulder belt is held between the bag main body and the handle, the center portion of the shoulder belt is located at a first position on the bag main body, wherein a length from a bottom portion of the bag main body to the first position is greater than 50% of a height of the bag main body, thereby preventing the shoulder belt from touching a ground.

2. The fishing bag according to claim 1, wherein the center portion of the shoulder belt is configured to be held between the bag main body and the handle.

3. The fishing bag according to claim 1, wherein the detachable attachment portion of the handle is detachably fixed to the bag main body using a hook-and-loop fastener, a snap fastener, or a magnet.

4. The fishing bag according to claim 1, wherein the shoulder belt includes a shoulder pad, and the shoulder pad is configured to be held between the end portions of the handle.

5. The fishing bag according to claim 1, wherein the handle includes a handle center portion, and the detachable attachment portion of the handle is provided between the handle center portion and at least one of the end portions of the handle.

6. The fishing bag according to claim 1, wherein the end portions of the shoulder belt are attached to first and third side surface portions of the bag main body, wherein the first and third side surface portions are opposite to each other, and the end portions of the handle are provided to second and fourth side surface portions of the bag main body, wherein the second and fourth side surface portions are opposite to each other and different from the first and third side surface portions.

7. The fishing bag according to claim 1, wherein a height of the detachable attachment portion of the handle from the bottom portion of the bag main body is 50% to 95% of the height of the bag main body.

8. The fishing bag according to claim 1, wherein a length between the end portions of the handle is 20% to 80% of a width of a side surface portion of the bag main body to which the end portions of the handle are attached.

* * * * *